(12) United States Patent
Tontz

(10) Patent No.: US 10,655,830 B2
(45) Date of Patent: May 19, 2020

(54) DEVICE FOR REMOTE LIGHT SWITCH CONTROL

(71) Applicant: Michael A. Tontz, Coronado, CA (US)

(72) Inventor: Michael A. Tontz, Coronado, CA (US)

( * ) Notice: Subject to any disclaimer, the term of this patent is extended or adjusted under 35 U.S.C. 154(b) by 0 days.

(21) Appl. No.: 16/125,169

(22) Filed: Sep. 7, 2018

(65) Prior Publication Data

US 2020/0080714 A1 Mar. 12, 2020

(51) Int. Cl.
*F21V 23/04* (2006.01)
*H02H 7/00* (2006.01)
*H02H 7/20* (2006.01)
*H02H 3/00* (2006.01)
*H02H 1/00* (2006.01)

(52) U.S. Cl.
CPC ....... *F21V 23/0435* (2013.01); *H02H 1/0007* (2013.01); *H02H 3/00* (2013.01); *H02H 7/005* (2013.01); *H02H 7/20* (2013.01)

(58) Field of Classification Search
None
See application file for complete search history.

(56) References Cited

U.S. PATENT DOCUMENTS

2014/0265905 A1 * 9/2014 Ray .......................... F21S 9/02
315/210

* cited by examiner

*Primary Examiner* — Ashok Patel
(74) *Attorney, Agent, or Firm* — Nydegger & Associates

(57) ABSTRACT

An adapter that provides a remote control capability for a light switch is mounted on a support structure (e.g. a wall), and includes a base plate which is also mounted on the support structure to surround the ON/OFF mechanism of the light switch. A cover which can be selectively attached to the base plate establishes an enclosed space between the base plate and the cover. A connector is mounted on the adapter in the enclosed space to interact mechanically with the ON/OFF mechanism of the light switch. The connector also interacts electronically with an activator that is positioned at a remote location. In operation, the connector at the adapter is responsive to an input signal from the remotely located activator that will operate the ON/OFF mechanism. Alternatively, the ON/OFF mechanism can be disconnected from the activator and operated manually.

8 Claims, 3 Drawing Sheets

DEVICE FOR REMOTE LIGHT SWITCH CONTROL

FIELD OF THE INVENTION

The present invention pertains generally to ON/OFF switches for activating and deactivating electric lights. More particularly, the present invention pertains to light switches that can be fitted with an adapter for remotely controlling an operation of the light. The present invention is particularly, but not exclusively, useful for light switches that can be operated either manually or electronically.

BACKGROUND OF THE INVENTION

Simplicity, efficiency and convenience are all favorable attributes for an electro-mechanical device. The functionality of such a device is further enhanced if it can also be flexibly employed and operated. A simple light switch is a case in point.

It almost goes without saying that many different types of indoor and outdoor lighting systems are widely used throughout the industrialized world. It happens, however, that the functionality of these different systems will vary greatly. Accordingly, the respective ON/OFF mechanism for operating the different lighting systems will also vary greatly.

It is in the domestic setting where the versatility of a lighting system is, perhaps, most important. People spend most of their time indoor at home. Moreover, it is in the home where the greatest number and diversity of different lighting systems are used and located.

With the above in mind, it is an object of the present invention to provide an adapter for the ON/OFF mechanism of a light switch that allows the switch to be operated manually or electronically. It is another object of the present invention to provide an adapter for the ON/OFF mechanism of a light switch that allows the switch to be operated at the location of the light switch or from the location of a remote site. Still another object of the present invention is to provide an adapter for the ON/OFF mechanism of a light switch that is easy to install, is easy to operate and relatively cost effective.

SUMMARY OF THE INVENTION

An adapter assembly which can be installed to establish a remote control capability for the ON/OFF mechanism of a light switch includes a base plate that is affixed to a support structure (e.g. a wall) on which the light switch is mounted. The adapter assembly also includes a cover that is mounted on the base plate. Furthermore, it also includes a connector that is mounted on the cover to mechanically interact with the ON/OFF mechanism of the light switch.

In order to establish a remote control capability for the light switch, an activator can be positioned at a predetermined location that is remote from the connector. Preferably, the activator will electronically interact with the connector via a wire link or a wireless link. In either case, the connector will be responsive to an input signal from the activator at the remote location that will manipulate the ON/OFF mechanism between an ON configuration and an OFF configuration for the light switch.

In greater structural detail, when the cover is attached to the base plate an enclosed space is created between the two of them. Consequently, both the base plate and the cover of the adapter assembly are formed with apertures that are aligned and overlap with each other to provide access to the ON/OFF mechanism of the light switch from outside the enclosed space.

For the remote control capability for the adapter assembly, a receiver is mounted on the connector inside the enclosed space, and the receiver is electronically linked with the connector. In addition to the receiver, a transmitter is positioned with the activator at the remote location. Within this combination of structure, the transmitter may be activated either manually or electronically by the operation of a sensor. As envisioned for the present invention, the sensor may be of any type well known in the pertinent art, such as a motion sensor, a pressure sensor, or a noise sensor. In each case, when a perturbation is sensed by the activator, an input signal will be transmitted to the receiver. The connector will then operate in response to the input signal. In a preferred embodiment of the present invention, a breaker switch is provided to disconnect the activator from the connector for a manual operation only of the light switch.

Depending on the type of ON/OFF mechanism that is used, respectively different embodiments are envisioned for the connector. For one, when the ON/OFF mechanism is a toggle switch having an arm, the connector will include a sleeve that is dimensioned to fit on the toggle switch arm. A drive rod is also included which interconnects the sleeve with a motor in the connector. In this combination, the motor moves the sleeve via the drive rod to manipulate the toggle switch of the ON/OFF mechanism. For another embodiment of the connector, when the ON/OFF mechanism is a decora type switch having a rocker, the connector will include a sleeve that is dimensioned to fit over the rocker. Similar to the toggle switch embodiment, a drive rod interconnects the rocker sleeve with a motor in the connector. In this combination, the motor moves the rocker sleeve via the drive rod to manipulate the rocker of the ON/OFF mechanism.

For operationally assembling the adapter, a first engagement device is formed on the base plate, and a second engagement device is formed on the cover. In detail, the first engagement device includes a hook and a snap clip. On the other hand, the second engagement device includes a loop for engagement with the hook of the first engagement device and a prong for engagement with the snap clip of the first engagement device. With a proper manipulation of these interactive structures, the cover, with is connector and receiver, can be attached to the base plate.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
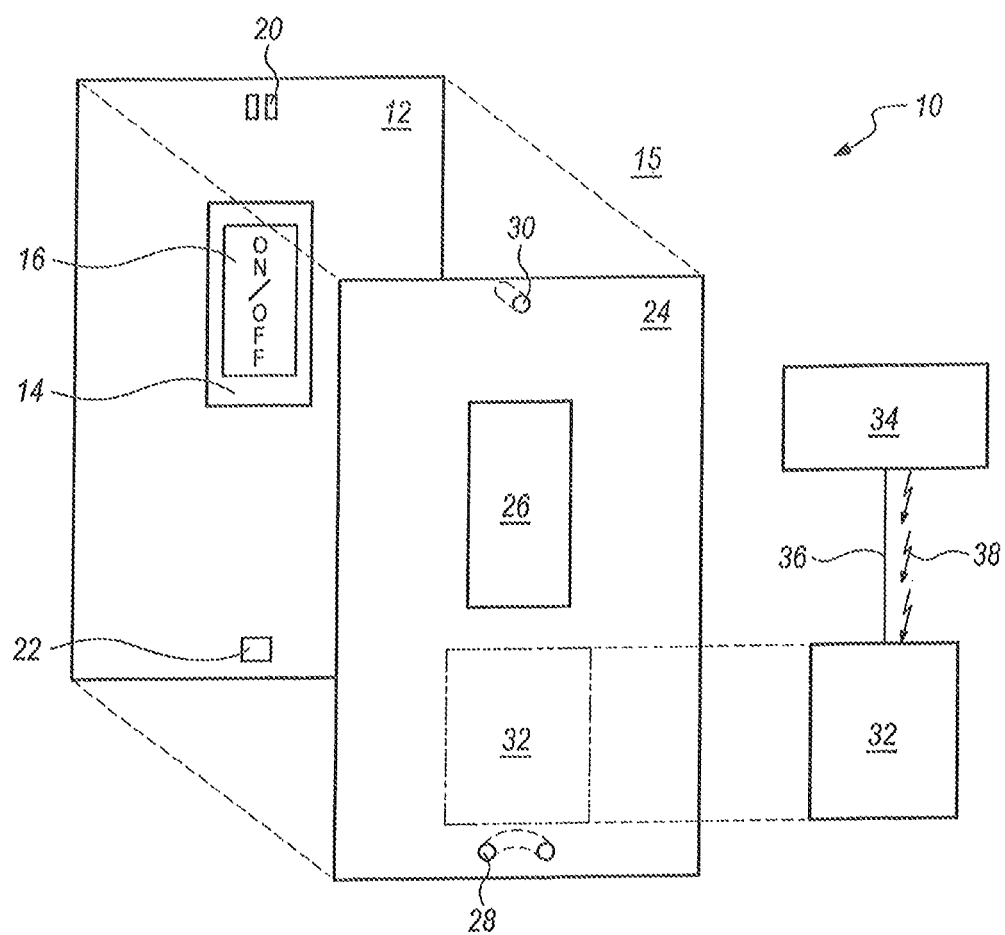
FIG. 1 is an exploded view of an adapter assembly in accordance with the present invention.

Referring initially to FIG. 1, an adapter assembly in accordance with the present invention is shown in an exploded presentation, and it is generally designated 10. As shown, the adapter assembly 10 includes a base plate 12 that is formed with an aperture 14. For purposes of the present invention, the base plate 12 is fixedly mounted on a support structure 15 so that an ON/OFF mechanism 16 will be accessible through the aperture 14. Typically, the ON/OFF mechanism 16 will also be mounted on the support structure 15, and it will be operatively connected with an electric light 18 (see FIG. 2). It is also shown in FIG. 1 that the adapter assembly 10 is formed with fastening devices such as a snap clip 20 and a hook 22. The support structure 15 will normally be a wall, but as will be appreciated by the skilled artisan the support structure can be any structure that is relatively stationary.

Still referring to FIG. 1 it will be seen that the adapter assembly 10 also includes a cover 24 which is formed with an aperture 26. Also, it will be seen that the cover 24 includes a loop 28 and a prong 30. As intended for the present invention, the loop 28 on cover 24 can be engaged with the hook 22 on base plate 12, and the prong 30 on cover 24 can be engaged with the snap clip 20 on base plate 12. With these engagements, the cover 24 can be secured to the base plate 12 to establish two important structural features for the adapter assembly 10. For one, the aperture 26 of cover 24 will be aligned to overlap with the aperture 14 of base plate 12 to allow manual access to the ON/OFF mechanism 16. For another, an enclosed space (no reference character given) is created between the base plate 12 and the cover 24.

In FIG. 1 it will further be seen that the adapter assembly 10 also includes a connector 32 and an activator 34. It is envisioned for the present invention that the activator 34 will be located at a site that is remote from the adapter assembly 10. With a structure that is disclosed below in detail, the purpose of the activator 34 is to electronically operate the connector 32. Accordingly, the activator 34 is connected with the connector 32 via either a wire link 36, or by a wireless link that is represented by arrows 38. FIG. 1 also shows that the connector 32, indicated by a dot-dash line, is positioned inside the enclosed space between the base plate 12 and the cover 24. For this particular combination of structure it is recognized that the connector 32 may be mounted either on the base plate 12 or on the cover 24. In either case, it is important that the connector 32 be operatively engaged with the ON/OFF mechanism 16 as more clearly shown in FIG. 2.

Figure 2:
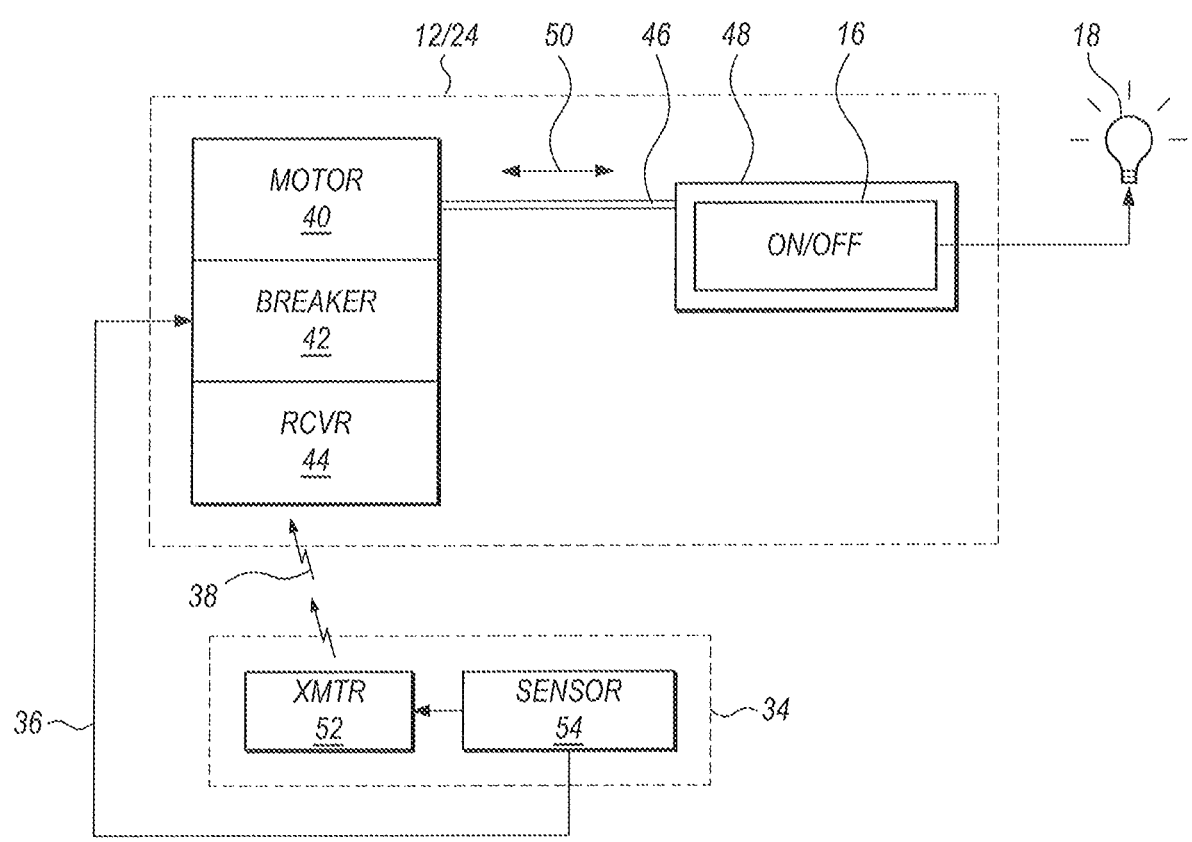
FIG. 2 is a schematic presentation of interactive components for the present invention.

With reference to FIG. 2, and in cross reference with FIG. 1, it is to be appreciated that the components of the connector 32 include: a motor 40, a breaker switch 42, and a drive rod 46. Also included are a drive rod 46 and a sleeve 48. In detail, the drive rod 46 interconnects the motor 40 with the sleeve 48. Thus, in an operation of the adapter assembly 10, the drive rod 46 will be operated by the motor 40 to move the sleeve 48 back or forth in directions generally indicated by the arrows 50.

It is also shown in FIG. 2 that the activator 34 includes a transmitter 52 and a sensor 54. In combination, the sensor 54 is connected to transmitter 52. With this connection, input from the sensor 54 can be sent from the remote site to the receiver 44 of the connector 32 via the wireless link represented by arrows 38. Alternatively, input from the sensor 54 can be sent directly to the breaker switch 42, via the wire link 36. In either case, the connector 32 is employed to operate the ON/OFF mechanism 16 for the purpose of turning the electric light 18 either ON or OFF. As envisioned for the present invention, the sensor 54 can be of any type well known in the pertinent art that is capable of generating an input signal in response to a predetermined perturbation at the remote site. Thus, for example, the sensor 54 may be sensitive to pressure, sound, light, temperature, motion or combinations thereof.

In accordance with the present invention, the adapter assembly 10 may be operated either manually with a direct user manipulation of the ON/OFF mechanism 16, or it may be operated electronically by using the activator 34. Also, when operated electronically, the adapter assembly 10 may be wirelessly connected with the activator 34.

As envisioned by the present invention, the ON/OFF mechanism may be of several different types, all well known in the field of electric lighting. Two types of ON/OFF mechanisms are particularly prominent. One is a standard toggle switch (not shown) which has an arm that can be rotated. The other is a well-known decora switch (not shown) which, rather than having a toggle, has a rocker. For both types of ON/OFF mechanisms, the present invention envisions the use of a sleeve 48 that is specifically dimensioned to fit respectively onto either the toggle switch arm or the rocker. As disclosed above, in each case, the drive rod 46 is connected with the sleeve 48 and is operated by the motor 40 to manipulate the ON/OFF mechanism 16.

Figure 3:
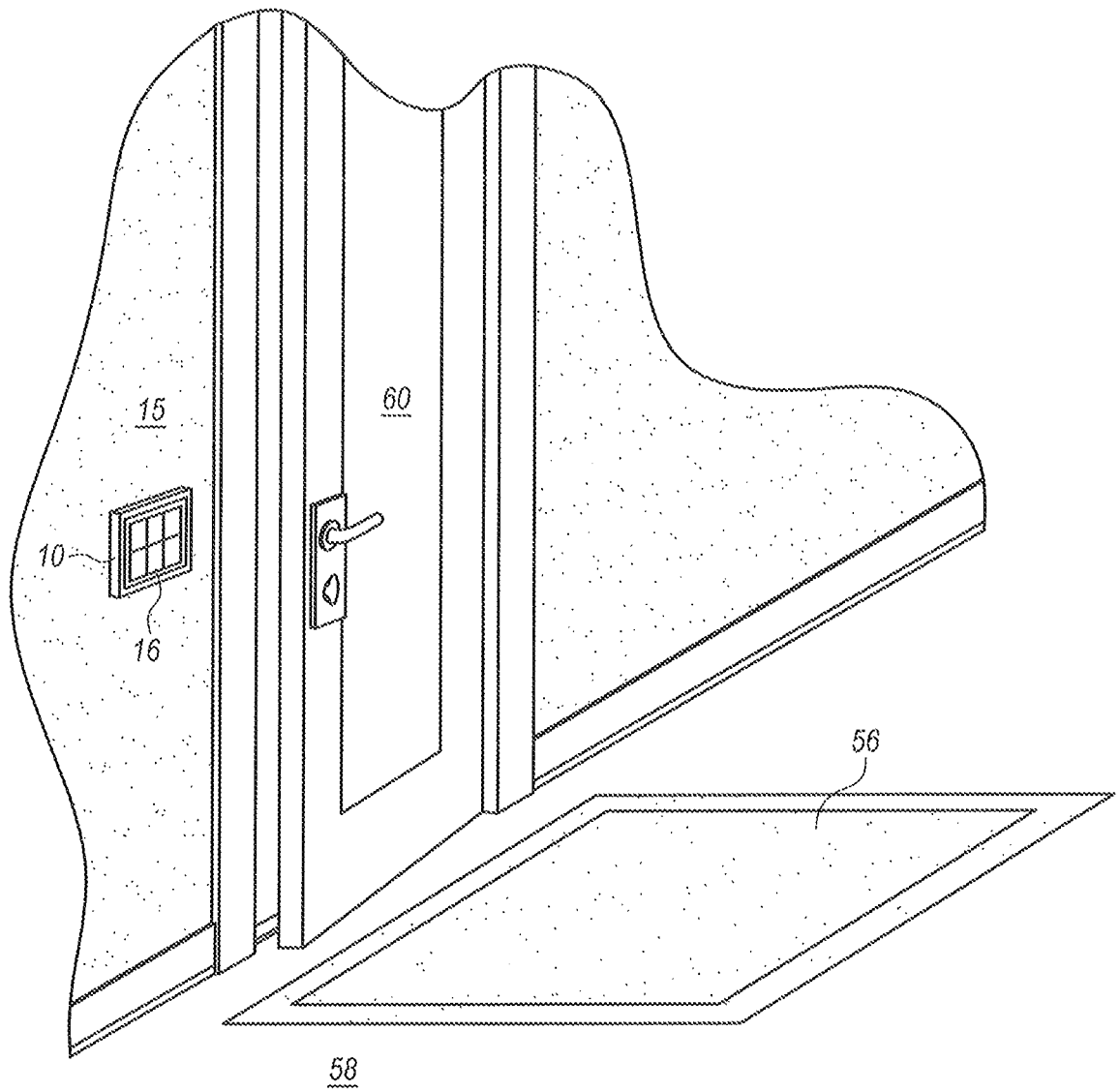
FIG. 3 is a perspective view of an environment for operation of the present invention.

For a preferred embodiment of the present invention, FIG. 3 shows that the activator 34 is incorporated into any commercially available floor mat 56. In particular, however, both a sensor 54 and a transmitter 52 will be incorporated with the activator 34 to allow for flexibility in the placement of the floor mat 56. For this embodiment, the sensor 54 is preferably a pressure sensor, and the floor mat 56 can be conveniently positioned at any location on a substantially flat surface, such as on the floor 58 near a door 60.

While the particular Device for Remote Light Switch Control as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for installing an adapter assembly to establish a remote control capability for the ON/OFF mechanism of a light switch, wherein the light switch is mounted on a support structure, the method comprising the steps of:

affixing a base plate to the support structure, wherein the base plate is formed with an aperture to provide access to the ON/OFF mechanism of the light switch;

attaching a cover onto the base plate to create an enclosed space between the cover and the base plate, wherein the cover is formed with an aperture to provide access to the ON/OFF mechanism of the light switch from outside the enclosed space;

mounting a connector on the cover in the enclosed space to mechanically interact with the ON/OFF mechanism of the light switch; and positioning an activator incorporated into a floor mat at a site remote from the connector for electronically interacting with the connector, wherein the connector is responsive to an input signal from the activator to manipulate the ON/OFF mechanism between an ON configuration for the light switch and an OFF configuration for the light switch.

2. The method of claim 1 further comprising the steps of:

electronically linking a receiver with the connector in the enclosed space; and locating a transmitter with the activator at the remote site for transmitting the input signal to the receiver for operating the connector in response to the input signal.

3. The method of claim 2 wherein the ON/OFF mechanism is a toggle switch having an arm and the method further comprises the steps of:
fitting a sleeve on the toggle switch arm; and
connecting a drive rod between the sleeve and the connector, wherein the connector moves the sleeve via the drive rod to manipulate the toggle switch of the ON/OFF mechanism.

4. The method of claim 2 wherein the ON/OFF mechanism is a decora switch having a rocker, and the method further comprises the steps of:
fitting a rocker sleeve over the rocker of the decora switch; and
connecting a drive rod between the rocker sleeve and the connector, wherein the connector moves the rocker sleeve via the drive rod to manipulate the rocker of the ON/OFF mechanism.

5. The method of claim 1 further comprising the steps of:
engaging a loop on the cover with a hook on the base plate; and
joining a prong on the cover with a snap clip on the base plate to attach the cover onto the base plate.

6. The method of claim 2 further comprising the steps of:
providing a sensor for detecting a perturbation at the remote site; and
linking the sensor with the transmitter, wherein the transmitter is sensitive to the perturbation and responds by sending the input signal to the receiver, wherein the sensor and the transmitter are incorporated into the floor mat and the sensor is a pressure sensor.

7. The method of claim 1 further comprising the step of providing a breaker switch to disconnect the activator from the connector for manual operation only of the light switch.

8. The method of claim 1 wherein the attaching step is accomplished by screwing the base plate to the support structure, and wherein the support structure is a wall.

* * * * *